UNITED STATES PATENT OFFICE.

RICHARD WOLFFENSTEIN, OF BERLIN, GERMANY.

PROCESS OF PRODUCING HYDROGEN PEROXID.

No. 870,148.　　　　Specification of Letters Patent.　　　　Patented Nov. 5, 1907.

Application filed June 15, 1906. Serial No. 321,847.

*To all whom it may concern:*

Be it known that I, RICHARD WOLFFENSTEIN, a subject of the Emperor of Germany, and a resident of Berlin, Germany, have invented a new and useful Process of Producing Hydrogen Peroxid, of which the following is a specification.

The preparation of hydrogen peroxid by the action of carbonic acid on barium peroxid is described by Duprey Comptes Rendus, 55, 736 and by Balard, *loc. cit.* 55, 738. According to the statements of these authors the process is carried out by adding barium peroxid in small quantities to water through which a rapid current of carbonic acid is passed so that carbonic acid is always in excess of the quantity of barium peroxid. The authors admit that by this process only a dilute solution of hydrogen peroxid can be obtained and that in order to obtain more concentrated solutions the barium carbonate which is formed must be filtered off and fresh quantities of barium peroxid added to the filtrate containing hydrogen peroxid. Repetition of these experiments confirms the statements of Duprey. For example: 100 grams of barium peroxid were introduced into 500 cc. of water through which a rapid current of carbonic acid passed, the barium peroxid being added in portions of about 5 to 10 grams each, so that an excess of carbonic acid was always present. At first a certain decomposition of the barium peroxid into hydrogen peroxid took place, but this gradually diminished and finally ceased altogether. The experiment was stopped after about 2½ hours and a further passage of carbonic acid through the mixture had no effect. On examination, the hydrogen peroxid solution thus formed decolorized 241 cc. of normal solution of potassium of permanganate while 100 grams of the barium peroxid employed was able to decolorize 1028 cc. permanganate. In fact, examination of the precipitate containing the barium carbonate showed that it contained the greater part of the barium peroxid undecomposed, since on titration it still decolorized more than 700 cc. normal potassium permanganate solution. The reaction was therefore extremely incomplete only amounting to about 25 per cent. of the materials employed, so that this method cannot be employed for technical purposes.

In my opinion the failure of the Duprey method appears to be due to the formation, after a certain quantity of barium peroxid has been added to the aqueous solution which is supersaturated with carbonic acid, of soluble barium bicarbonate, which reacts on meeting with fresh quantities of barium peroxid to form insoluble barium carbonate, which deposits upon and so closely envelops the barium peroxid that is not available to the action of fresh quantities of carbonic acid.

I have discovered that the conversion of barium peroxid into hydrogen peroxid by means of carbonic acid takes place almost quantitatively if the barium peroxid and not the carbonic acid is maintained in excess. Under these conditions it was discovered that barium percarbonate forms which is a new compound and comparatively stable. Working under these conditions therefore no foreign substance is deposited upon the barium peroxid and enveloping same, but the whole of the barium peroxid is converted into barium percarbonate. By the further action of fresh quantities of carbonic acid a further reaction takes place and the barium carbonate already formed is split up into barium carbonate and hydrogen peroxid, probably with an intermediate formation of the water soluble barium bicarbonate. The whole process therefore occupies several phases, which to a large extent succeed one another in point of time, so that the course of the reaction may be followed analytically. The new process is also distinguished from that of Duprey by being carried out during the earlier stages in alkaline solution whereas according to the statements of Duprey the acid reaction of the carbonic acid prevails from the commencement.

The most important condition to be observed in the manufacture of hydrogen peroxid through barium percarbonate, is that the solution should be at first maintained alkaline and allowed to become acid only, when the decomposition of the barium percarbonate into hydrogen peroxid is ready to take place. The rate of introduction of the carbonic acid must therefore be regulated, and when working in extremely dilute solutions, for instance, it is necessary to introduce the carbonic acid slowly because the water absorbs a certain quantity of carbonic acid and otherwise the mixture would acquire an acid reaction. On the other hand when working in concentrated solution, where the carbonic acid almost only comes into contact with the basic barium oxid or barium peroxid, the introduction may be rapid.

The following is an example of my process and of the estimation tests at various stages thereof: 230 grams barium peroxid suspended in 1000 cc. water is saturated with a stream of carbonic acid. Samples were drawn at intervals of 5 minutes at the beginning and subsequently every 10 minutes. The estimation of the hydrogen peroxid contained in the solution was carried out by titration with decinormal potassium permanganate.

Beginning of the experiment:

| Time | | | | | | |
|---|---|---|---|---|---|---|
| 12.00 o'clock | 1 cc. solution | = | 0,1 | cc. | 1/10 N. $KM_nO_4$. | |
| 12.05 | 1 " | " | 0,1 | " | " | " |
| 12.10 | 1 " | " | 0,1 | " | " | " |
| 12.15 | 1 " | " | 0,1 | " | " | " |
| 12.20 | 1 " | " | 0,15 | " | " | " |
| 12.25 | 1 " | " | 0,15 | " | " | " |
| 12.30 | 1 " | " | 0,15 | " | " | " |
| 12.35 | 1 " | " | 0,15 | " | " | " |
| 12.45 | 1 " | " | 0,15 | " | " | " |
| 12.55 | 1 " | " | 0,15 | " | " | " |
| 1.05 | 1 " | " | 0,2 | " | " | " |
| 1.15 | 1 " | " | 0,3 | " | " | " |
| 1.25 | 1 " | " | 1,9 | " | " | " |
| 1.32 | 1 " | " | 7,5 | " | " | " |
| 1.45 | 1 " | " | 13,7 | " | " | " |
| 1.55 | 1 " | " | 16,1 | " | " | " |
| 2.05 | 1 " | " | 18,0 | " | " | " |
| 2.15 | 1 " | " | 18,7 | " | " | " |

The technical advantage of working in alkaline solution according to this invention is that the conversion of the barium peroxid into hydrogen peroxid takes place almost quantitatively; the hydrogen peroxid being much better protected against decomposition when in the form of barium percarbonate than when contained in the solution in a free state, as is the case where the solution is acid from the commencement of the operation.

I employ the expression "barium peroxid" herein broadly to include hydrated barium peroxid.

Having thus described my invention, I claim as new and desire to secure by Letters Patent:

1. The process of producing hydrogen peroxid which consists in treating barium peroxid with carbonic acid; the treatment being commenced in alkaline solution and continued in acid solution.

2. The process of producing hydrogen peroxid which consists in causing a solution of carbonic acid to react upon barium peroxid; the latter being in excess during the first phase of the reaction and the former in excess during a subsequent phase.

In testimony whereof, I have hereunto signed my name in the presence of two subscribing witnesses.

RICHARD WOLFFENSTEIN.

Witnesses:
HENRY HASPER,
WOLDEMAR HAUPT.